United States Patent [19]

Yagisawa et al.

[11] Patent Number: 5,081,550
[45] Date of Patent: Jan. 14, 1992

[54] REPRODUCING APPARATUS EMPLOYING TRACK-CONTROLLED MULTI-ROTARY-HEAD DEVICE

[75] Inventors: Toshihiro Yagisawa; Shinichi Yamashita; Mitsuru Owada, all of Kanagawa, Japan

[73] Assignee: Canon Kabushiki Kaisha, Tokyo, Japan

[21] Appl. No.: 405,558

[22] Filed: Sep. 11, 1989

[30] Foreign Application Priority Data

Sep. 14, 1988 [JP] Japan .................................. 63-230920

[51] Int. Cl.⁵ ............................................... G11B 5/55
[52] U.S. Cl. ............................... 360/78.02; 360/77.14; 360/70
[58] Field of Search ............... 360/78.01, 78.02, 77.12, 360/77.13, 77.14, 77.15, 70

[56] References Cited

U.S. PATENT DOCUMENTS 4,760,475 7/1988 Wong et al. ..................... 360/77.13

Primary Examiner—Aristotelis Psitos
Attorney, Agent, or Firm—Robin, Blecker, Daley & Driscoll

[57] ABSTRACT

An apparatus for reproducing signals from a multiplicity of parallel tracks in a recording medium by means of n number of rotary heads, n being an integer not less than 3. A transportation device for transporting the recording medium is controlled on the basis of two kinds of signal: namely, a tracking control signal for leading one of the n number of rotary heads to one of m number of tracks contained in consecutive n number of tracks, m being an integer not less than 2; and a track shift signal which is generated in accordance with the result of a determination as to whether the n number of rotary heads are tracing expected tracks and which enable the tracks under tracing to be shifted to obtain a predetermined relationship between the sequence of the n number of rotary heads and the sequence of the tracks traced by these rotary heads.

26 Claims, 10 Drawing Sheets

REPRODUCING APPARATUS EMPLOYING TRACK-CONTROLLED MULTI-ROTARY-HEAD DEVICE

BACKGROUND OF THE INVENTION

1. Field of the Invention

The present invention relates to a reproducing apparatus and, more particularly, to a reproducing apparatus having a multi-rotary-head device having n number of rotary heads (n being 3 or greater) for reproducing signals from a recording medium which has a multiplicity of parallel tracks.

2. Description of the Related Art:

Helical-scan type magnetic recording and reproducing apparatus have been known which have rotary video heads capable of recording and reproducing video signals in and from video tracks which are formed in a magnetic tape at an inclination to the longitudinal axis of the magnetic tape. This type of apparatus essentially requires tracking control for enabling the rotary video head to accurately scan the video track during recording and reproduction, and various tracking control systems have been proposed up to now.

In general, a recording and reproducing apparatus employing such a tracking control is arranged to enable the rotary heads to perform self-recording/reproduction, i.e., such that a signal from a track is reproduced by the same rotary head as that used for recording the signal in this track. Namely, in a magnetic recording and reproducing apparatus employing a plurality of rotary heads, errors are inevitably involved in regard to the positions of the heads relative to one another, track widths of the rotary heads, and so forth, so that the recording and reproducing performance is seriously impaired when recording and reproduction of a signal in and from a track are performed by different rotary heads.

In recent years, multi-channel rotary-head type recording and reproducing apparatus, capable of simultaneously recording or reproducing signals of a plurality of channels, have been developed for use in digital VTRs (DVTR).

In general, a video signal is a wide-band signal so that a huge amount of data per unit time is produced when the video signal is digitized. It is difficult to magnetically record and reproduce such a huge amount of digital data in a serial manner. To overcome this difficulty, it has been proposed to use multi-channel type system for handling these video data so that each channel has a reduced data rate. This is the reason why the multi-channel recording and reproduction system is used in DVTRs.

The above-mentioned self-recording/reproduction is more significant when used in DVTRs employing the multi-channel recording and reproducing system because the use of different rotary heads for recording and reproduction of signals from a given track will cause a relative time-offset of the signals between recording and reproducing phases. DVTRs are required to be able to perform error correction by making use of signals reproduced from all the channels. The reproduced signals involving the above-mentioned time offset cannot be used for such error correction.

For this reason, in known DVTRs, it has been a common measure to conduct a tracking control so as to enable all the rotary heads to perform self-recording/reproduction, even when a large number of heads are employed.

An increase in the number of heads, however, undesirably prolongs the time till a tracking control drawing state is obtained. Namely, in the case of a DVTR having 8 heads, each head is aimed at only one out of 8 tracks so that a maximum mis-tracking amount is as large as ±4 tracks. Therefore, a considerably long time is required until the tracking control is drawn after start-up of the system or when the tracking control has failed for any reason. No video signal is reproduced during the tracking control so that a random image is displayed to discomfort the user.

The use of 8 heads also requires that the pattern of the recording signals for the tracking control is formed in 8-track period, so that the recording and reproducing circuits are complicated. In a system in which tracking control relies upon a pilot signal recorded in a portion of each track, problems are encountered not only in that the recording and reproducing circuits are complicated but also a large area of recording is occupied by the pilot signals, failing to meet demand for higher information recording density.

These problems become more serious as the number of the channels is increased, i.e., the number of tracks with which the signal processing has been completed. This makes it difficult to meet a future demand for higher recording density of signals of wide band.

SUMMARY OF THE INVENTION

Accordingly, one object of the present invention is to provide a reproducing apparatus of multi-rotary-head type which is improved to overcome the above-described problems of the prior art.

Another object of the present invention is to provide a reproducing apparatus of rotary-head type which prevents the tracking control drawing time from increasing even when the number of the rotary heads is increased, thus offering a shorter tracking control completion time as compared with known apparatus of a similar arrangement.

To this end, according to one aspect of the present invention, there is provided a apparatus for reproducing signals from a multiplicity of parallel tracks on a recording medium, comprising: transportation means for transporting the recording medium; n number of rotary heads for tracing the recording medium, n being an integer which is not less than 3, the n number of rotary heads being located such that, when the recording medium is transported at a predetermined speed by the transportation means, the n number of rotary heads trace consecutive n number of tracks among the multiplicity of tracks; first means for producing a tracking control signal for leading one of the n number of rotary heads to any one of m number of tracks included in the consecutive n number of tracks; judging means for judging whether one of the n number of rotary heads is tracing a predetermined track of the consecutive n number of tracks; second means for generating a track shift signal for shifting tracks traced by the n number of rotary heads in accordance with a judgment signal output from the judging means; and control means for controlling the transportation mean by using the tracking control signal and the track shift signal.

These and other objects, features and advantages of the present invention will become clear from the following description of the preferred embodiments when

DESCRIPTION OF THE PREFERRED EMBODIMENTS

A DVRT as an embodiment of the present invention will be described with reference to the drawings.

The description will commence with an illustration of the outline of the DVTR.

The tracking control employed in this embodiment makes use of pilot signals recorded in predetermined tracking-exclusive area. Pilot signals for different tracks have different frequencies. During the reproduction, any tracking offset is detected through detection of cross-talk from an adjacent track. The pilot signals have frequencies within a low-frequency range so as to reduce azimuth loss of two types of rotary heads arranged at different azimuth angles. The tracking-exclusive area in which the pilot signal is recorded is minimized for the purpose of increasing the information recording density, and the pilot signal frequency is determined to be as high as possible within the above-mentioned low frequency range so as to maximize the number of waves recorded in the restricted tracking-exclusive area.

Additional information (ID) for identifying the head with which information was recorded in each track is also recorded in such a track. During the reproduction, the additional information (ID) is also reproduced to enable a decision as to whether the reproduction is being done by the same head as that used for the recording. If the reproduction is being done by the same head, the above-mentioned tracking control is continued. If not, a track shift signal is generated to transport the tape so as to quickly shift the track which is being traced by the head.

It is thus possible to shorten the tracking control drawing time, while ensuring that recording and reproduction are effected by the same head.

The embodiment will be described in more detail with reference to the drawings.

Figure 1:
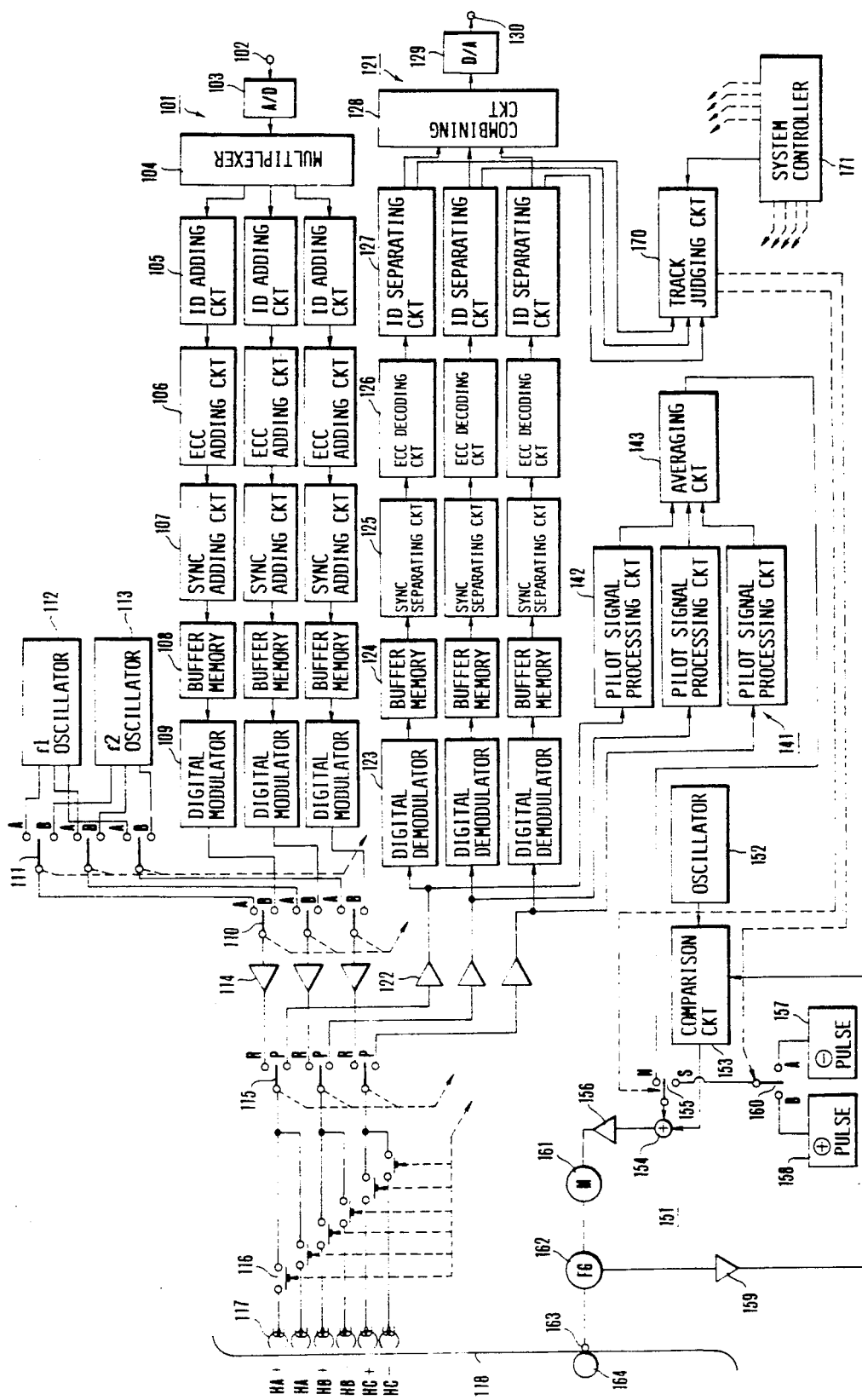
FIG. 1 is a schematic block diagram of a DVRT as an embodiment of the present invention.

Referring to FIG. 1, the DVTR embodying the present invention is used for recording and reproducing information signals in and from a magnetic tape 118. The DVTR generally has a recording signal processing system 101, a reproduced signal processing system 121, a reproduced pilot signal processing system 141, a capstan servo system 151, and heads which are represented by HA+, HA−, HB+, HB+, HC+ and HC−.

Figure 2A:
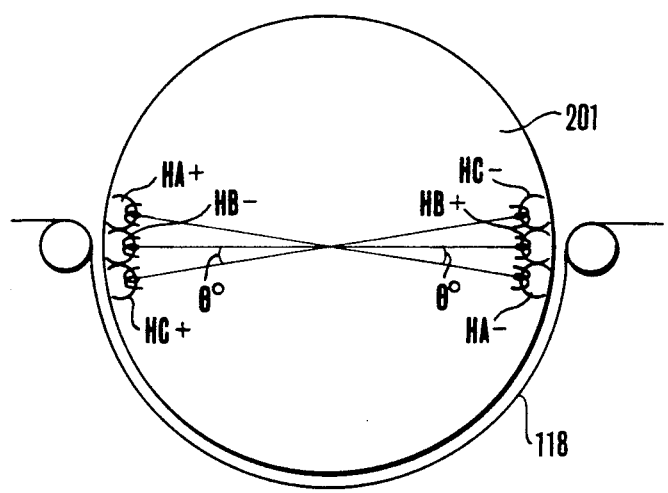
FIGS. 2(A) and 2(B) are illustrations of the head device employed in the DVTR of FIG. 1.
Figure 2B:
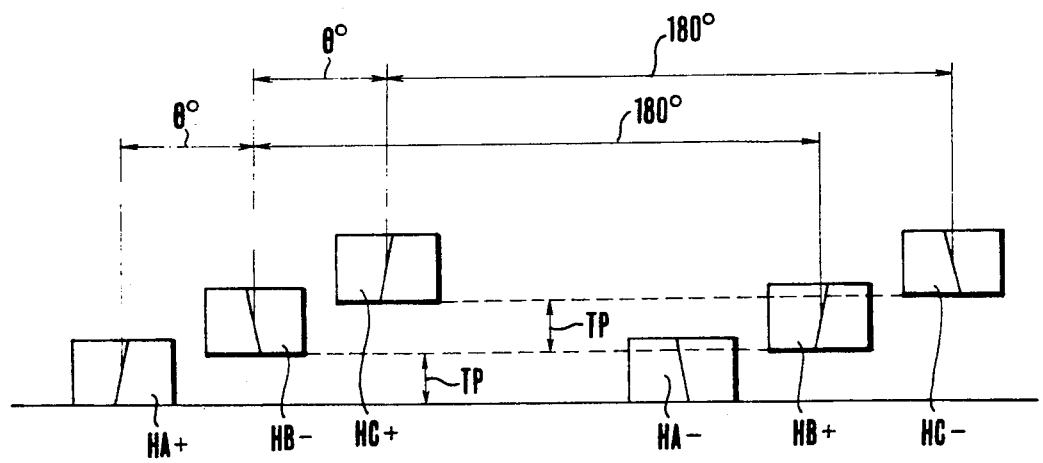

FIGS. 2(A) and 2(B) show the arrangement of the heads in the DVTR shown in FIG. 1. Referring to FIG. 2(A), the magnetic tape 118 is wound on the outer peripheral surface of the rotary cylinder 201 over an angle which is 180° or greater. Heads HA+, HB+ and HC+ of plus azimuth and heads HA−, HB− and HC− of minus azimuth are fixed to the cylinder 201. The heads HA+ and HA− rotate at a 180° phase interval from each other. Similarly, 180° phase differences are formed between the heads HB+ and HB− and between the heads HC+ and HC−, respectively. A phase difference $\theta$ of rotation is formed between the heads HA+ and HB−, between the heads HB− and HC+, between the heads HA− and HB+, and between the heads HB+ and HC−, respectively. Furthermore, the heads HB− and HB+ are arranged with a height step or distance TP with respect to the heads HA+ and HA−, in the direction of axis of rotation, as shown in FIGS. 2(B). The same axis step TP is formed also between the heads HB−, HB+ and the heads HC+, HC−.

Figure 3:
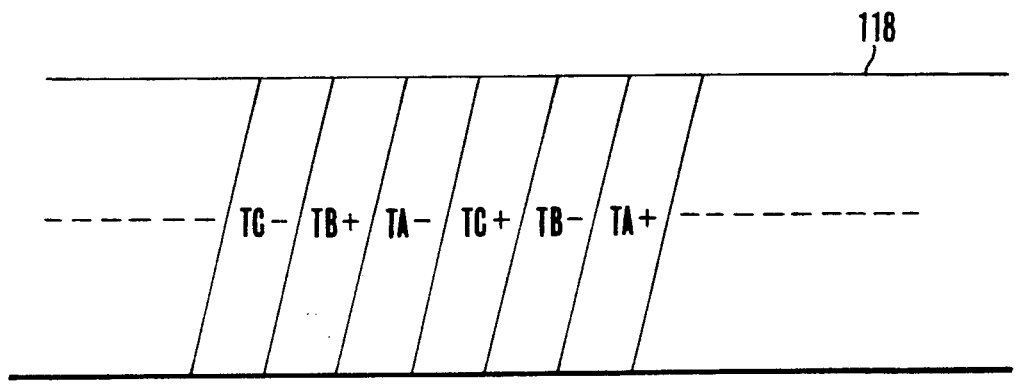
FIG. 3 is an illustration of a recording pattern formed by the DVRT shown in FIG. 1.

FIG. 3 is an illustration of the pattern of recording on the magnetic tape 118, i.e., tracks which are formed during one full rotation of the drum 201. Symbols TA+, TB−, TC+, TA−, TB+ and TC− show, respectively, tracks recorded by the heads HA+, HB−, HC+, HA−, HB+ and HC−, respectively.

Referring first to the recording signal processing system 101, a video signal input through a terminal 102 is digitized by an A/D converter 103 and is divided into three channels by a multiplexer 104.

The aforementioned additional information ID is added to video data of each channel by an ID adding circuit 105. A number corresponding to the head used for the recording is added to the ID. In this embodiment, 6 heads are used for recording information in 6 tracks in each period. Codes corresponding to numbers "1" to "6" are therefore added to the ID. Then, an ECC adding circuit 106 adds an error detection code (ECC) to the data of each channel, and synchronizing data is added by a sync adding circuit 107. The data is then supplied to a buffer memory 108 which adjusts the timing of the data. The data is then transmitted to a digital modulator 109 which effects a predetermined modulation, and the thus modulated data is output to the terminal B of a switch 110 which is used for recording a later-mentioned tracking control pilot signal in a predetermined tracking area. The switch 110 is controlled by a system controller 171 such that it selects the terminal A only at a timing which corresponds to the tracking area. Two oscillators, namely, an $f_1$ oscillator 112 and an $f_2$ oscillator 113, are used for producing two different frequency signals $f_1$ and $f_2$ which are to be used as pilot signals. A switch 111 is capable of selecting one of the outputs of the $f_1$ oscillator 112 and the $f_2$ oscillator 113 to enable a plus azimuth head and a minus azimuth head to record the pilot signals $f_1$ and $f_2$, respectively, for each of the tracks. This switch 111 also is under the control of the system controller 171. Three recording-reproduction change-over switches are connected to the output sides of three recording amplifiers 114. The outputs of the recording amplifiers 114 are delivered to heads 117 through the terminals R of the three channels of the recording/reproducing change-over switches 115.

There are 6 switches 116 which control the states of connection of the heads. These switches 116 are operated in synchronization with the rotation of the rotary drum such that the respective heads are enabled to perform recording on the magnetic tape 118 as shown in FIG. 3.

It is to be understood that the IDs recorded in the tracks TA+, TB−, TC+, TA−, TB+ and TC− respectively contain codes 1, 2, 3, 4, 5 and 6 which correspond to the numbers of the heads used for the recording.

Figure 4:
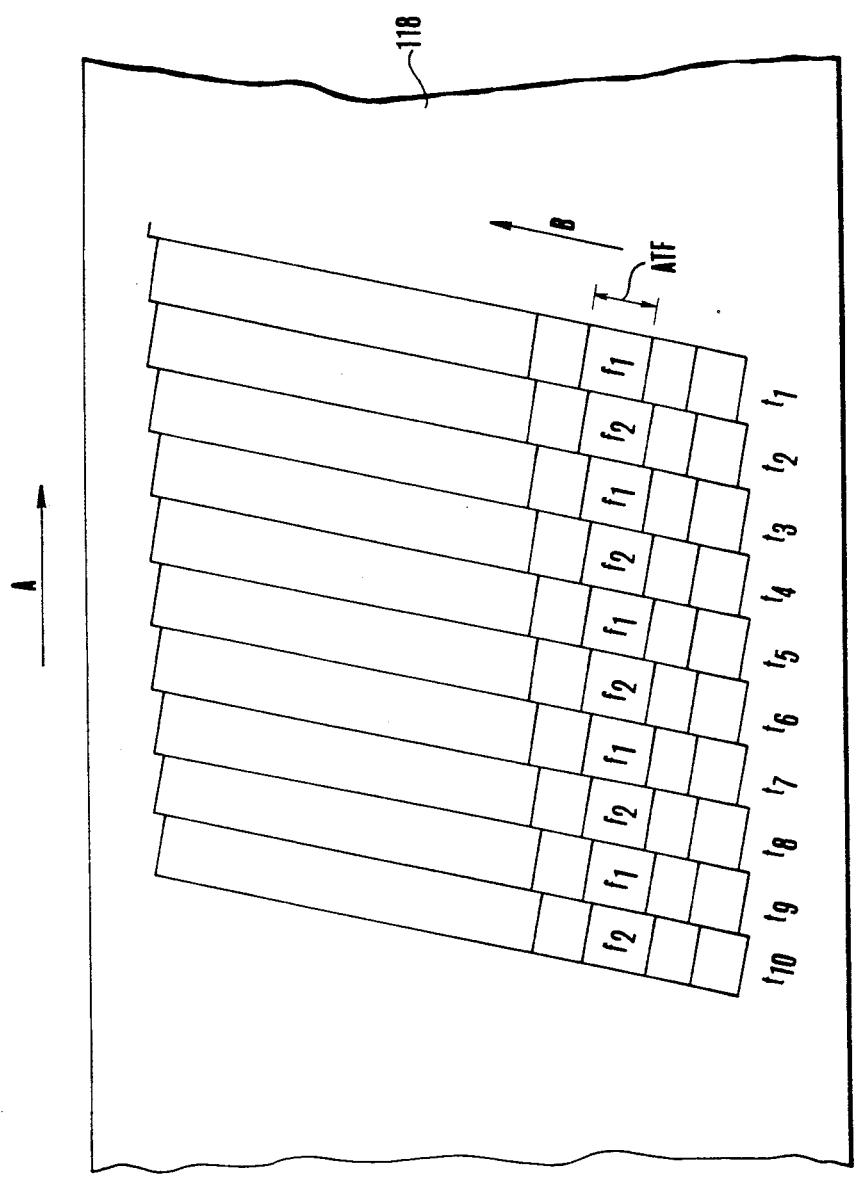
FIGS. 4 and 5 are illustrations explanatory of the recording pattern of pilot signals used for the tracking control in the DVRT of FIG. 1.
Figure 5:
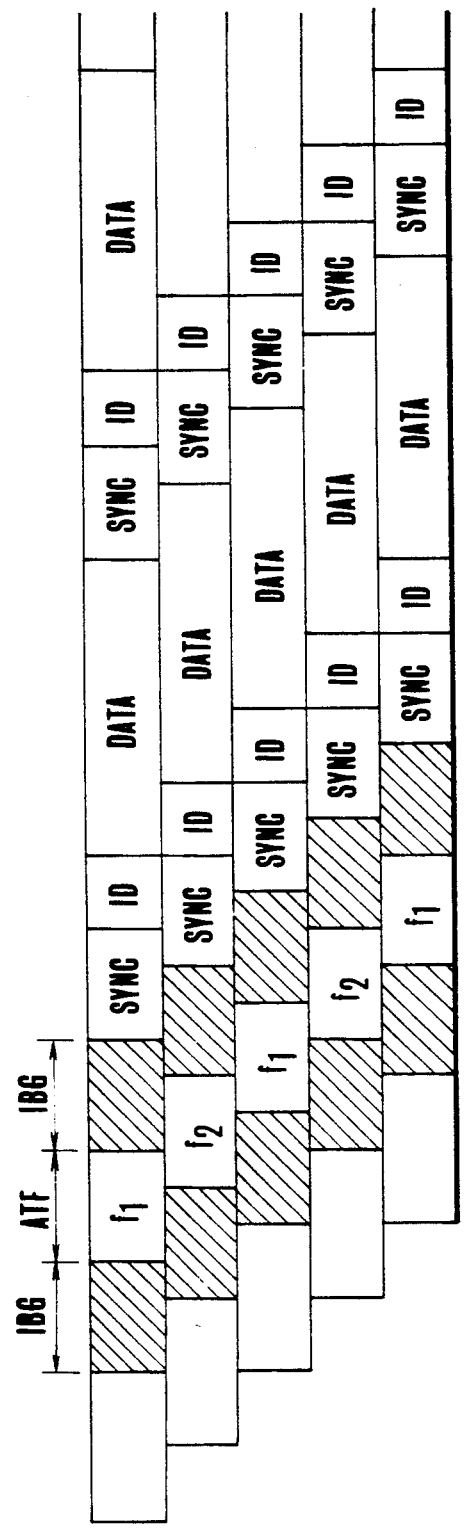

FIG. 4 illustrates the pattern of recording of the pilot signals. Symbols $t_1$ to $t_{10}$ show tracks recorded by the rotary heads. An arrow A indicates the direction of movement of the tape 118, while an arrow B indicates the direction of scan by the rotary head. FIG. 5 is an enlarged view of a portion around the pilot signal recording area ATF shown in FIG. 4. Pilot signals recorded in the recording areas ATF of alternating tracks have different frequencies $f_1$ and $f_2$. The pilot signal recording areas ATF of the tracks are so formed that the areas ATF of adjacent tracks partially overlap each other. Preferably, the arrangement is such that the starting end of the area ATF of one track is located substantially at the center of the area ATF of one of two adjacent tracks, while the terminal end of the above-mentioned area ATF is located substantially at the center of the area ATF of the other adjacent track, as shown in FIG. 5.

The hatched area IBG in FIG. 5 is a recording area for recording a demagnetization or erasion frequency. Areas Sync, Data and ID are for recording the synchronizing data, video data and ID, respectively.

During recording, the tape 118 is made to run at a predetermined speed by means of a capstan servo system 151 which includes a capstan 163, a capstan motor 161, and a pinch roller 164. A frequency generator 162 coupled to the capstan 163 is rotated in synchronization with the rotation of the capstan 163 so as to generate an alternating current signal (FG) of a frequency corresponding to the speed of rotation of the capstan 163. The signal FG is supplied to a frequency comparison circuit 153 through a shaping amplifier 159. The frequency comparison circuit 153 also receives an alternating current signal of a constant reference frequency supplied from an oscillator 152.

The output of the comparison circuit 153 indicative of the result of the comparison is supplied to the motor 161 through an adder 154 and a drive amplifier 156, so that the motor 161 operates such that the signal FG output of the amplifier 159 coincides with the frequency of the output of the oscillator 152, whereby the tape 118 is transported at a constant speed. During recording, the switch 155 is grounded so that the amplifier 156 receives only the output of the comparison circuit 153.

The reproducing operation of this embodiment is as follows.

The switches 116 are controlled in the same timing as the recording so that 3-channel reproduction signals are obtained through the terminals P of the switches 115. The 3-channel reproduction signals are supplied through amplifiers 122 to digital demodulators 123 and pilot signal processing circuits 142. The reproduction signals supplied to the digital demodulators 123 are digitally demodulated and the thus obtained demodulated signals are supplied to sync separating circuits 125 via buffer memories 124 which control the timing. The sync separating circuits 125 separate synchronizing signals from the respective demodulated signals, and the data is restored in accordance with the separated synchronizing signals. The restored data are then supplied to ECC decoding circuits 126 which perform error correction. The data, after the error correction, are supplied to ID separating circuits 127 in which IDs are separated. The remaining data formed as a result of separation of IDs are supplied to a combining circuit 128 which combines the 3-channel data into a 1-channel data signal. The thus obtained 1-channel signal is delivered to an output terminal 130 after a D/A conversion through a D/A converter 129.

Figure 6:
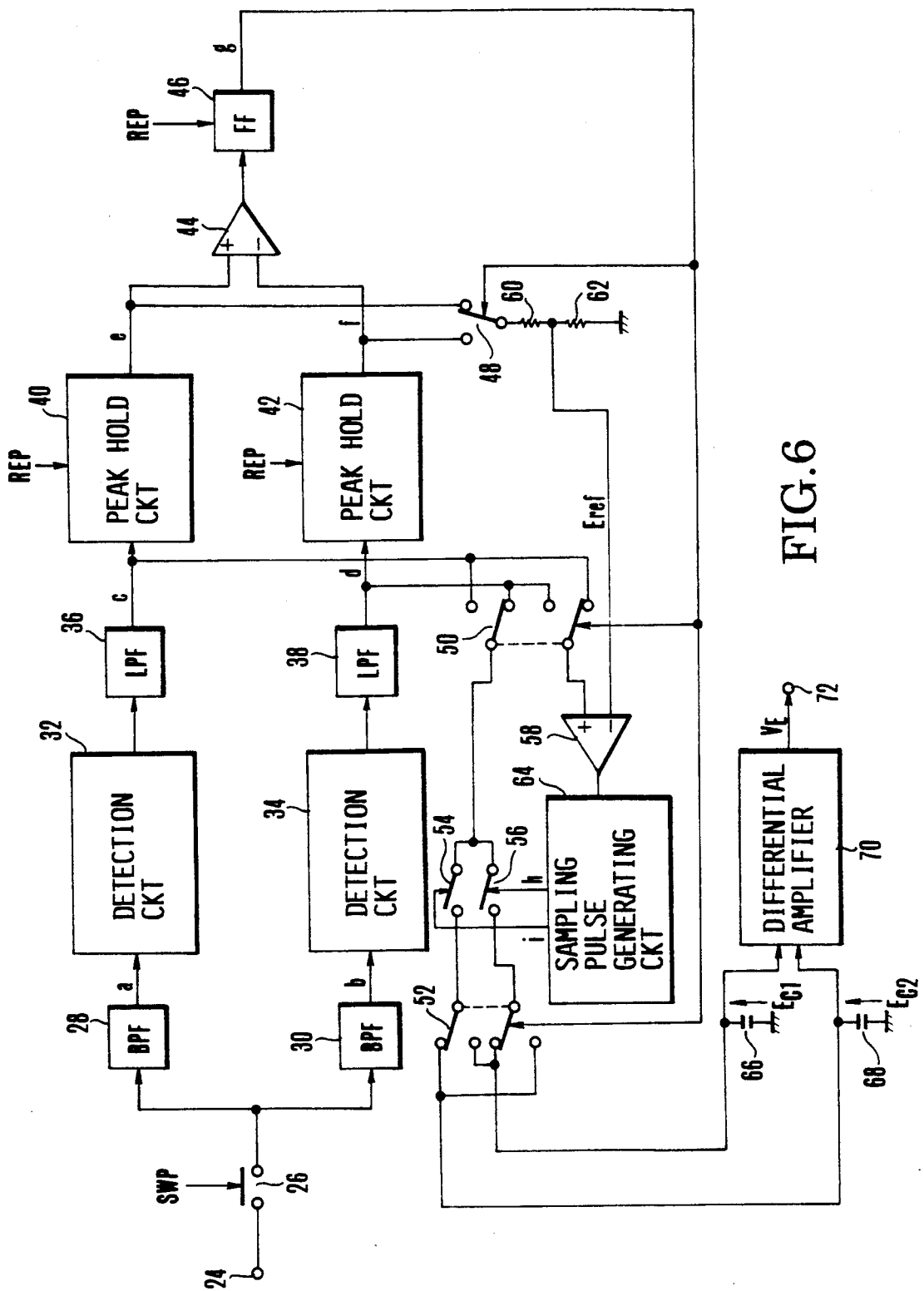
FIG. 6 is an illustration of an example of the pilot signal processing circuit of FIG. 1.
Figure 7:
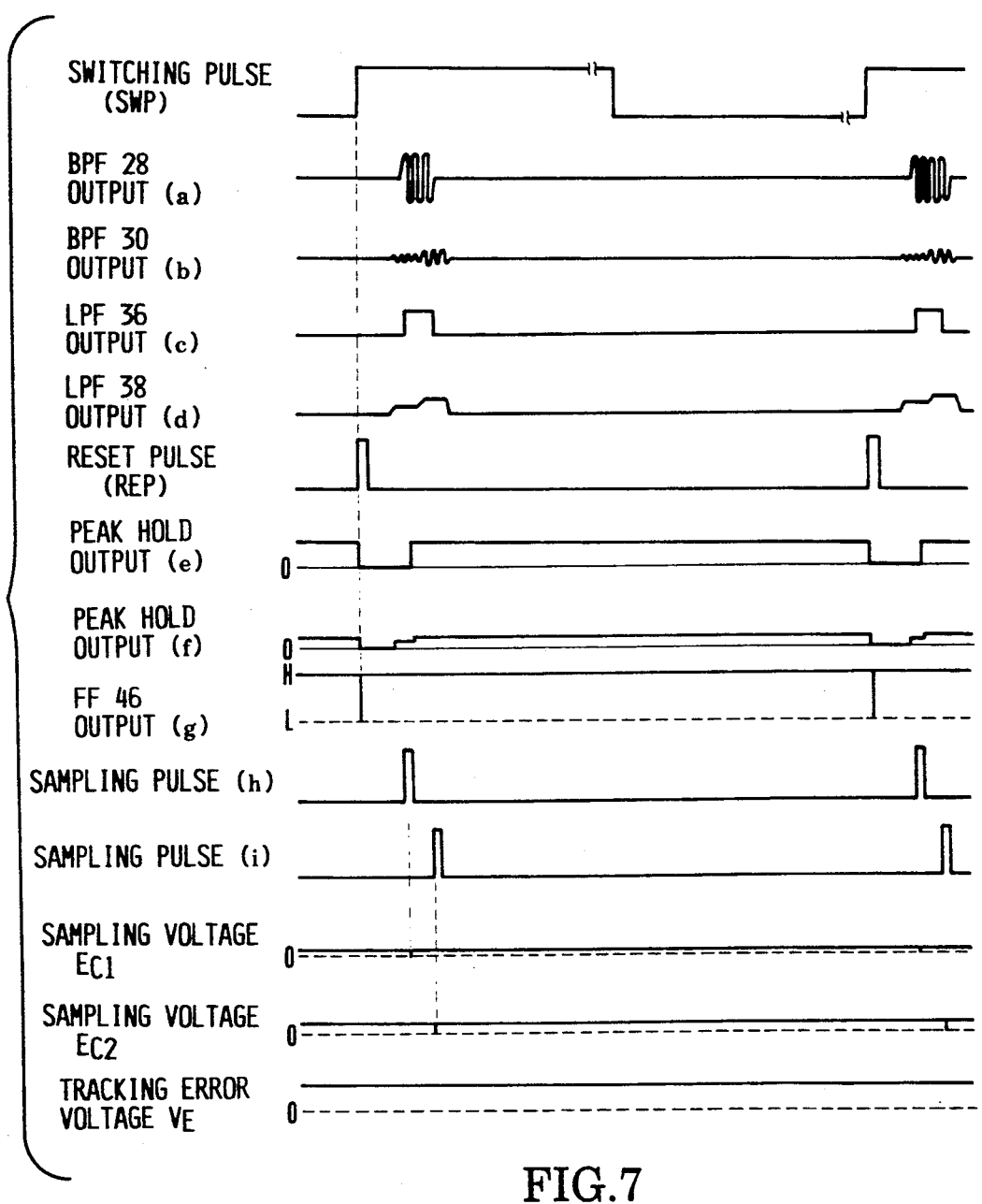
FIG. 7 is a timing chart showing waveforms of signals obtained at various portions of the circuit shown in FIG. 6.

A description will be given of the reproduced pilot signal processing system 141. FIG. 6 shows a practical example of each of the three pilot signal processing circuits 142. FIG. 7 is a timing chart showing waveforms of various signals available at various portions of the circuit shown in FIG. 6.

The output of the reproduction amplifier 122 is supplied to the pilot signal processing circuit 142 through the terminal 24. This signal is delivered to a gate 26 which allows the signal to pass therethrough only in the period in which the tape 118 is traced by the heads HA+, HB− and HC+. The reproduced pilot signals $f_1$ and $f_2$ in the gated signals are picked-up through the band-pass filters (BPF) 28 and 30, respectively. Numerals 32 and 34 denote, respectively, detection circuits for detecting the pilot signals $f_1$ and $f_2$. The outputs of the detection circuits 32 and 34 are made to pass through low-pass filters (LPF) 36 and 38 so that envelope signals c and d of the levels corresponding to the levels of the detected signals are obtained.

Peak hold circuits 40 and 42 are capable of holding the maximum values of outputs c and d of the LPFs 36 and 38. A comparison circuit 44 compares the values e and f held by the respective peak hold circuits 40 and 42, and a selection is conducted as to whether the signals $f_1$ and $f_2$ are used for detection of tracking offset or for sampling. The output of the comparison circuit 44 is delivered to a flip-flop (FF) 46 which latches this signal in a phase matching to a reset pulse REP. The reset pulse REP is generated by a monostable multivibrator using the rising portion of the switching pulse SWP as a trigger. The reset pulse REP also is used for resetting the peak hold circuits 40 and 42.

The fact that the level of the reproduced pilot signal is high means that most of the reproducing head is on the track in which the detected pilot frequency has been recorded.

A switch 50 is intended for effecting a switching between a mode in which the envelope signals c and d from the LPFs 36 and 38 are used for the detection of tracking offset and a mode in which the same are used for the purpose of sampling.

The envelope signals c and d, when used for tracking, are delivered to gate switches 54 and 56, whereas, when used for the sampling, these envelope signals are delivered to a comparison circuit 58. A reference numeral 48 denotes a switch for selecting the comparison reference signal for the sampling envelope signals. Upon receipt of an output of the flip-flop 46, the switch 48 operates to select the peak hold voltages of the reproduced pilot signal which has been selected for the sampling by the switch 50. A voltage obtained by dividing the peak-hold voltage by resistors 60 and 62 are used as the comparison reference voltage. In the illustrated case, the comparison reference voltage is determined to be ½ the peak-hole voltage.

A sampling pulse generating circuit 64 is capable of generating narrow sampling pulses in accordance with the rise and fall of the output of the comparison circuit 58. In this embodiment, the sampling pulse has a pulse width of 20 μs. The sampling pulse h produced in response to the rise of the output of the comparison circuit 58 instantaneously closes the switch 56, while the pulse i generated in response to the fall of the same output signal serves to instantaneously close the switch 54. As a result, the envelope signal voltages for detecting the tracking offset is sampled and is held by capacitors 66 and 68 through the switch 52. The voltages sampled by the sampling pulses h and i are cross-talk components of the pilot signals in the preceding and following adjacent tracks. The difference to the amount of offset of the rotary head from the $f_1$ between the levels of the sampled voltages corresponds track or the $f_2$ track, i.e., the track in which the pilot signal $f_1$ is recorded or the track in which the pilot signal $f_2$ is recorded.

The switch 52 is a polarity inversion circuit the polarity of which is switched in accordance with the output of the flip-flop 46. The switch 52 is so arranged as to enable selection between the $f_1$ track and the $f_2$ track to be tracked by the magnetic head HA+. When the connection is made as illustrated when the reproduction of the pilot signal $f_1$ is major, the tracking control is performed so as to enable the magnetic head to follow the $f_1$ track, whereas, when the connection is made while the reproduction of the pilot signal $f_2$ is major, a tracking control is conducted to cause the magnetic head to follow the $f_2$ track. For instance, the switching characteristics of the switch 52 are determined such that, among the three pilot signal processing circuits 142 of FIG. 1, the circuit which receives the signal reproduced through the head HA+ and the circuit which receives the signal reproduced through the head HB− are made to on-track the $f_1$ and $f_2$ tracks, respectively.

A differential amplifier 70 amplifies the difference of the voltages of the capacitors 66 and 68. The output of the differential amplifier 70 is delivered to an averaging circuit 143 through a terminal 72. The averaging circuit 143 computes the mean value of the outputs of the three pilot signal processing circuits 142. The mean value thus obtained is delivered, through a switch 155 which normally selects a terminal N, to an adder 154 so as to be added to the speed control signal, and the signal obtained as a result of the addition is delivered to the capstan motor 161 through the amplifier 154. In consequence, a tracking control is performed so as to enable the plus azimuth head and the minus azimuth head to trace the track carrying the pilot signal $f_1$ and the track carrying the pilot signal $f_2$, respectively.

Figure 8:
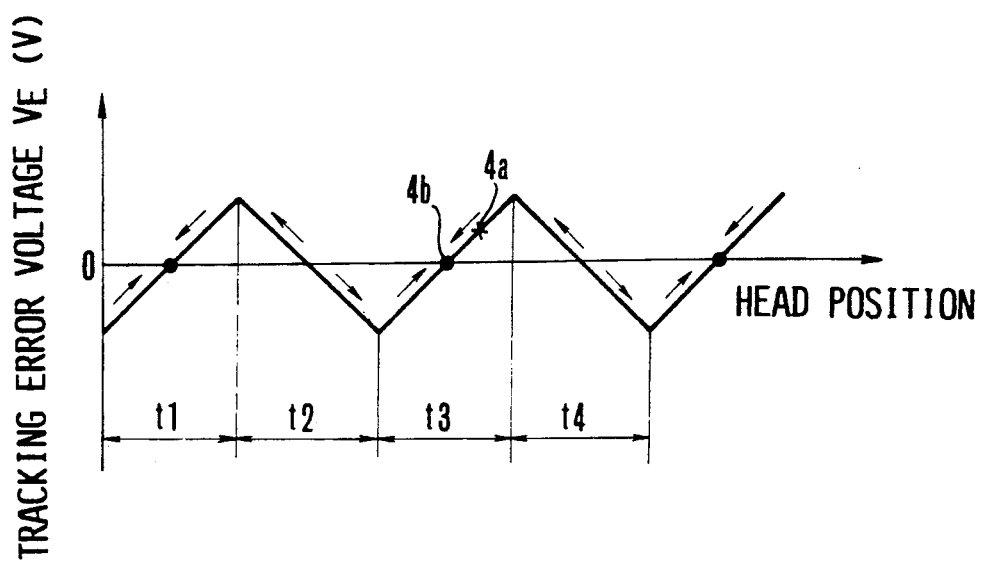
FIG. 8 is an illustration of tracking control characteristics relying upon the pilot signal processing circuit of FIG. 6.

FIG. 8 illustrates the tracking error characteristics of the apparatus in accordance with the present invention. The axis of abscissa represents the rotational position of the rotary head, while the axis of ordinate represents the tracking error voltage $V_E$. Symbols $t_1$ to $t_4$ represent the numbers of the tracks. Arrows appearing in FIG. 8 show the directions of the auto-tracking servo. In case of this model, the tracking error voltage is at a level 4a which corresponds to a state in which the rotary head is offset towards the track $t_4$. The capstan motor changes the tape feed speed such that the tracking error voltage $V_E$ is shifted from 4a to 4b. In consequence, the tracking offset with respect to the rotary head is corrected so that the rotary head accurately scans the track $t_3$.

On the other hand, referring to FIG. 1, the number corresponding to the head in the ID separated by the ID separating circuit 127 is supplied to a track judging circuit 170 so as to be compared with the number of the head which is determined on the basis of the rotational phase detected from the rotation of the rotary cylinder.

Figure 9A:
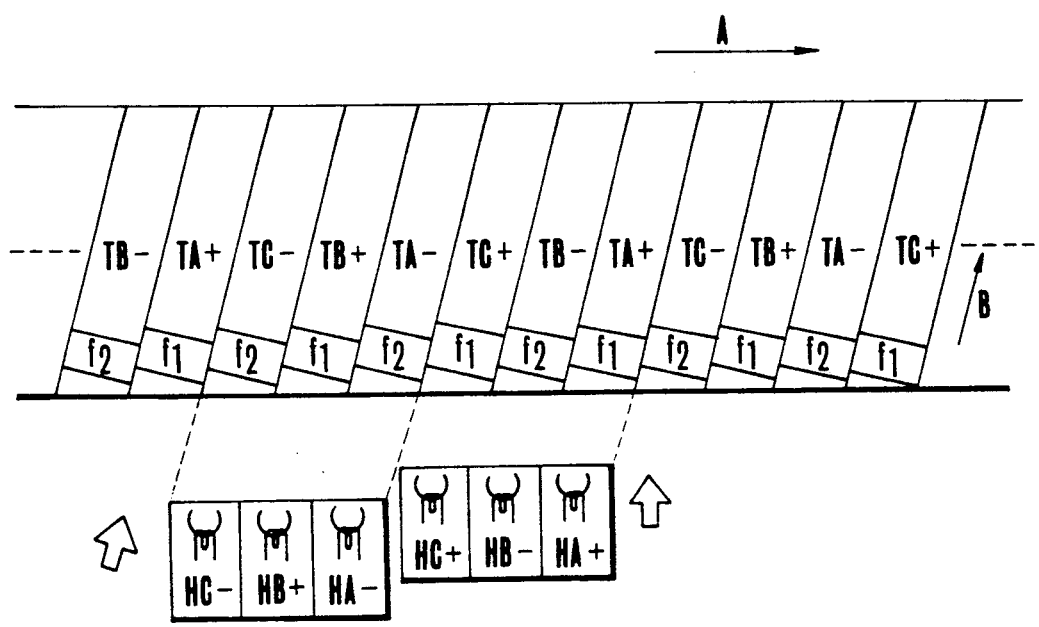
FIGS. 9(A), 9(B) and 9(C) are illustrations of the relationships between the heads and tracks in the DVRT of FIG. 1.
Figure 9B:
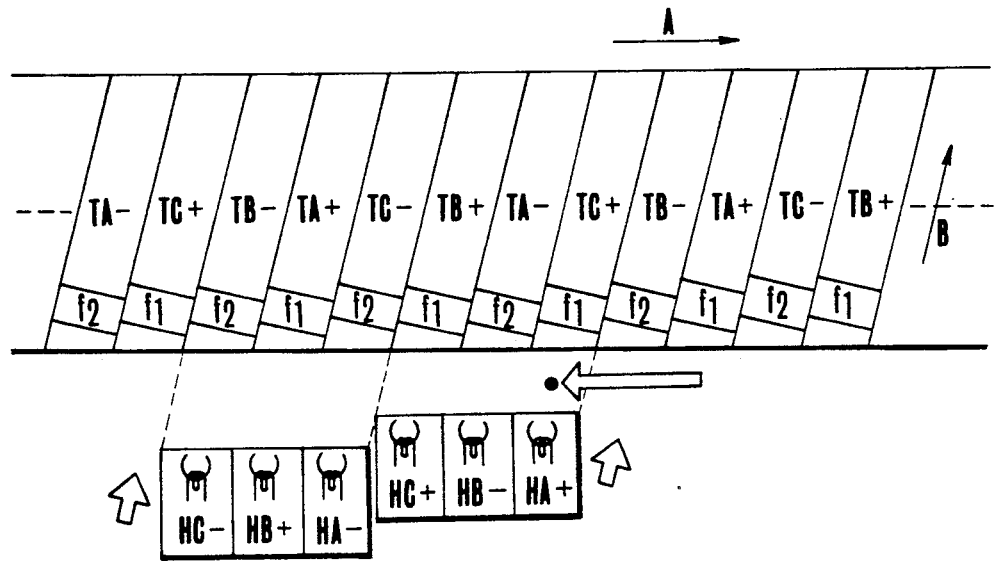
Figure 9C:
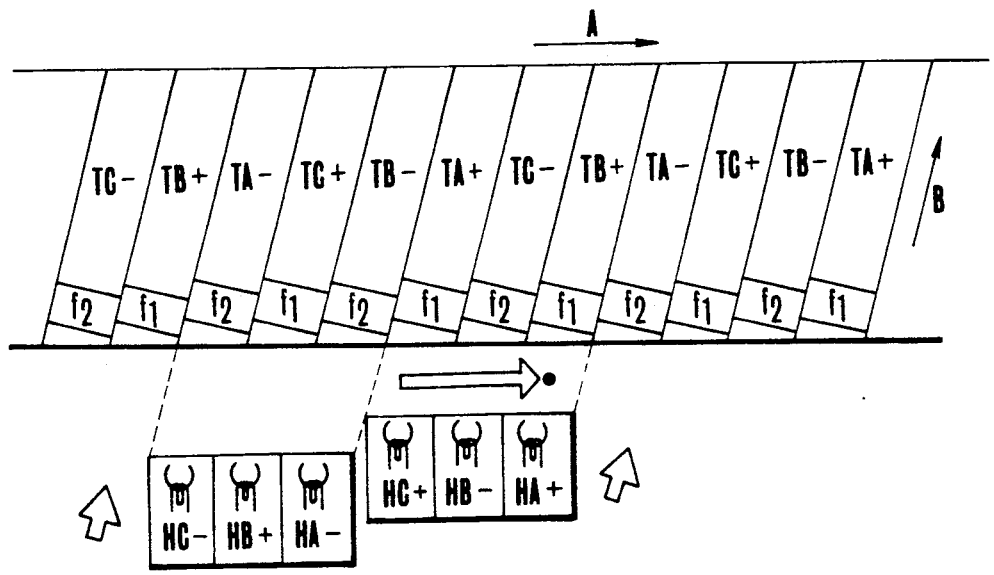

In this embodiment, one of the following three conditions shown in FIGS. 9(A), 9(B) and 9(C) may occur. In these figures, an arrow A indicates the direction of ordinary movement of the tape, while an arrow B shows the direction of scan of each magnetic head.

More specifically, FIG. 9(A) shows a condition in which the sequence of the numbers of tracks on the tape in terms of the head numbers coincides with the sequence of the magnetic heads used for reproduction. In this case, the track judging circuit 170 keeps the switch 155 connected to the terminal N as shown in FIG. 1, so that reproduction is continued while tracking control is being conducted.

When the sequence of the tracks on the tape in terms of the head numbers does not coincide with the sequence of the reproducing heads as shown in FIG. 9(B) or 9(C), the judging circuit 170 of FIG. 1 connects the switch 155 to the terminal S to discriminate whether the tracking control is in the state shown in FIG. 9(B) or in the state shown in FIG. 9(C), and operates the switch 160 in accordance with the result of discrimination. The plus pulse generator 158 and the minus pulse generator 157 are capable of generating pulse signals (track shift signals) for increasing and deceasing, respectively, the amount of shift of the tape by an amount corresponding to two tracks. More specifically, the plus pulse generator 158 is capable of generating pulses for advancing the tape 118 in the direction of running of the tape by an amount corresponding to two tracks, while the minus pulse generator 157 is capable of producing pulse signal for shifting the tape backward by an amount corresponding to two tracks.

In the state shown in FIG. 9(B), the aligned state shown in FIG. 9(A) can be obtained by backwardly shifting the tape in an amount corresponding to two tracks. To this end, the switch 160 is operated to select the terminal A. Conversely, the state shown in FIG. 9(C) can be changed to the aligned state shown in FIG. 9(A) by shifting the tape forward, i.e., in the direction of running of the tape, in an amount corresponding to two tracks. To this end, the switch 160 is operated to select the terminal B.

It is thus possible to obtain matching between the sequence of the tracks on the tape in terms of the numbers of the heads used in the recording and the sequence of the heads to be used for reproduction, whereby the self-recording/reproducing condition is obtained promptly.

Although the invention has been described with specific reference to a DVTR, the invention can be applied to various other signal processing apparatus capable of processing various types of signals such as random digital information signals other than video signals.

The described embodiment employs 6 heads and the tracking control system used in the described embodiment is designed to enable the heads to trace three tracks of the corresponding azimuth out of 6 consecutive tracks. This, however, is not exclusive and the advantages of the present invention are obtainable when the invention is applied to an apparatus having n number of heads which are to be tracking-controlled to trace two or more of consecutive n number of tracks.

Although the described embodiment employs a tracking control system which relies upon two different pilot signals of different frequencies recorded in alternating tracks, this arrangement is only illustrative and the invention does not exclude the use of other types of tracking control system.

As will be understood from the foregoing description, the present invention provides a recording and reproducing apparatus having a multi-rotary-head device, having a simple construction but yet capable of conducting tracking control to enable a plurality of rotary heads to trace the same tracks as those which were recorded by the respective rotary heads and also capable of shortening the time required for locating the heads before the start of the tracking control.

What is claimed is:

1. An apparatus for reproducing signals from a multiplicity of parallel tracks on a recording medium, comprising:
   (a) transportation means for transporting said recording medium;
   (b) (n×m) number of rotary heads for tracing said recording medium, n and m each being an integer which is not less than 2, said (n×m) number of rotary heads being located such that, when said recording medium is transported at a predetermined speed by said transportation means, said (n×m) number of rotary heads trace consecutive (n×m) number of tracks among said multiplicity of tracks;
   (c) first means for producing a tracking control signal for leading one of said (n×m) number of rotary heads to any one of m number of tracks included in said consecutive (n×m) number of tracks, said m number of tracks being arranged at an interval of n tracks;
   (d) judging means for judging whether one of said (n×m) number of rotary heads is tracing a predetermined track of said consecutive (n×m) number of tracks;
   (e) second means for generating a track shift signal for shifting tracks traced by said (n×m) number of rotary heads by n tracks in accordance with a judgment signal output from said judging means; and
   (f) control means for controlling said transportation means by using said tracking control signal and said track shift signal.

2. An apparatus according to claim 1, wherein said control means includes switching means for selectively outputting one of said tracking control signal and said track shift signal.

3. An apparatus according to claim 2, wherein said switching means outputs said tracking control signal when said judging means has determined that one of said (n×m) number of rotary heads is tracing the predetermined track of said consecutive (n×m) number of tracks.

4. An apparatus according to claim 2, wherein said switching means outputs said track shift signal when said judging means has determined that one of said (n×m) number of rotary heads is tracing a track other than the predetermined track of said consecutive (n×m) number of tracks.

5. An apparatus according to claim 2, wherein said control means includes speed control means for generating a speed control signal for enabling said transportation means to transport said recording medium at a speed coinciding with said predetermined speed, and an adder circuit for adding an output of said switching means and said speed control signal.

6. An apparatus according to claim 1, wherein said second means includes a switching circuit capable of selectively outputting one of a first track shift signal for increasing the speed of transportation of said recording medium by said transportation means and a second track shift signal for decreasing the speed of transportation of said recording medium by said transportation means.

7. An apparatus according to claim 1, wherein said multiplicity of parallel tracks are formed such that alternating tracks have different directions of magnetization so that every other track has the same direction of magnetization.

8. An apparatus according to claim 7, wherein said (n×m) number of rotary heads include a first group of rotary heads and a second group of rotary heads of the same number as the first group, the rotary heads of the first group having a first azimuth angle while the rotary heads of the second group has a second azimuth angle different from said first azimuth angle.

9. An apparatus according to claim 7, wherein said tracking control signal is a signal for leading one of said (n×m) number of rotary heads to any one of every other track included in said consecutive (n×m) number of tracks.

10. An apparatus according to claim 7, wherein two types of pilot signals of different frequencies are recorded in alternating ones of said multiplicity of parallel tracks, and wherein said first means is capable of forming said tracking control signal by using the pilot signal reproduced by at least one of said (n×m) number of rotary heads.

11. An apparatus according to claim 1, wherein an n number of types of pilot signals of different frequencies are recorded in consecutive ones of said multiplicity of parallel tracks, and wherein said first means is capable of forming said tracking control signal by using the pilot signals reproduced by at least one of said (n×m) number of rotary heads.

12. An apparatus according to claim 1, wherein identification numbers which enable identification of the respective tracks are recorded in said consecutive (n×m) number of tracks, and wherein said judging means conducts said judgment by using the identification number reproduced by at least one of said (n×m) number of rotary heads.

13. A signal recording and reproducing apparatus comprising:
   (a) transportation means for transporting a recording medium;
   (b) (n×m) number of rotary heads for tracing said recording medium to perform recording and reproduction of signals, n and m each being an integer which is not less than 2, said (n×m) number of rotary heads being located such that, when said recording medium is transported at a predetermined speed by said transportation means, said (n×m) number of rotary heads form consecutive (n×m) number of tracks to record signals or reproduce signals from said consecutive (n×m) number of tracks;
   (c) first means for producing a tracking control signal for leading one of said (n×m) number of rotary heads to any one of m number of tracks included in said consecutive (n×m) number of tracks, said m number of tracks being arranged in an interval of n tracks;

(d) judging means for judging whether said (n×m) number of rotary heads are tracing the same tracks as those in which information has been recorded by the same rotary heads;

(e) second means for generating a track shift signal for shifting tracks traced by said (n×m) number of rotary heads by n tracks in accordance with a judgment signal output from said judging means; and (f) control means for controlling said transportation means by using said tracking control signal and said track shift signal.

14. An apparatus according to claim 13, further comprising identification signal generating means for generating an identification signal for identifying each of said (n×m) number of rotary heads which has formed the respective tracks and supply means for supplying said identification signal to said (n×m) number of rotary heads.

15. An apparatus according to claim 14, wherein said judging means conducts said judgment by using said identification signal reproduced by at least one of said (n×m) number of rotary heads.

16. An apparatus according to claim 15, wherein said control means includes switching means for selectively outputting one of said tracking control signal and said track shift signal, said switching means being capable of outputting said tracking control signal when said judging means has judged that one of said (n×m) number of rotary heads is tracing the same track as that recorded by said one rotary head.

17. An apparatus according to claim 16, wherein said switching means is capable of outputting said track shift signal when said judging means has judged that one of said (n×m) number of rotary heads is tracing a track other than the track recorded by said one rotary head.

18. An apparatus for reproducing signals from a multiplicity of parallel tracks on a recording medium, identification numbers which enable identification of the respective tracks being recorded in consecutive n number of tracks, n being an integer which is not less than 3, comprising:

(a) transportation means for transporting said recording medium;

(b) n number of rotary heads for tracing said recording medium, said n number of rotary heads being located such that, when said recording medium is transported at a predetermined speed by said transportation means, said n number of rotary heads trace said consecutive n number of tracks among said multiplicity of tracks;

(c) first means for producing a tracking control signal for leading one of said n number of rotary heads to any one of m number of tracks included in said consecutive n number of tracks;

(d) discriminating means for discriminating a distance between one of said n number of rotary heads and a predetermined track of said consecutive n number of tracks; by using said identification number reproduced by one of said n number of rotary heads;

(e) second means for generating a track shift signal for shifting tracks traced by said n number of rotary heads in accordance with said distance discriminated by said discriminating means; and (f) control means for controlling said transportation means by using said tracking control signal and said track shift signal.

19. An apparatus according to claim 18, wherein said control means includes switching means for selectively outputting one of said tracking control signal and said track shift signal.

20. An apparatus according to claim 18, wherein said discriminating means further discriminates a shifting direction of the one of said n number of rotary heads from the predetermined track of said consecutive n number of tracks, and said second means includes a switching circuit capable of selectively outputting one of a first track shift signal for increasing the speed of transportation of said recording medium by said transportation means and a second track shift signal for decreasing the speed of transportation of said recording medium by said transportation means by using the shifting direction discriminated by said discriminating means.

21. An apparatus according to claim 18, wherein said multiplicity of parallel tracks are formed such that alternating tracks have different directions of magnetization so that every other track has the same direction of magnetization.

22. An apparatus according to claim 21, wherein said n number of rotary heads includes a first group of rotary heads and a second group of rotary heads of the same number as the first group, the rotary heads of the first group having the first azimuth angle while the rotary heads of the second group has a second azimuth angle different from said first azimuth angle.

23. An apparatus according to claim 21, wherein said tracking control signal is a signal for leading one of said n number of rotary heads to any one of every other track included in said consecutive n number of tracks.

24. An apparatus according to claim 21, wherein two types of pilot signals of different frequencies are recorded in alternating ones of said multiplicity of parallel tracks, and wherein said first means is capable of forming said tracking control signal by using the pilot signal reproduced by at least one of said n number of rotary heads.

25. A signal recording and reproducing apparatus comprising:

(a) transportation means for transporting a recording medium;

(b) n number of rotary heads for tracing said recording medium to perform recording and reproduction of signals, n being an integer which is not less than 3, said n number of rotary heads being located such that, when said recording medium is transported at a predetermined speed by said transportation means, said n number of rotary heads form consecutive n number of tracks to record signals and identification numbers or reproduce signals from said consecutive n number of tracks, the identification numbers enabling identification of the respective tracks being recorded in the consecutive n number of tracks;

(c) first means for producing a tracking control signal for leading one of said n number of rotary heads to any one of m number of tracks included in said consecutive n number of tracks;

(d) discriminating means for discriminating a distance between one of said n number of rotary heads and a predetermined track of said consecutive n number of tracks, by using said identification numbers reproduced by one of said n number of rotary heads;

(e) second means for generating a track shift signal for shifting tracks traced by said n number of rotary heads in accordance with said distance discriminated by said discriminating means; and (f) control means for controlling said transportation means by using said tracking control signal and said track shift signal.

26. An apparatus according to claim 25, wherein said discriminating means further discriminates a shifting direction of the one of said n number of rotary heads from the predetermined track of said consecutive n number of tracks, and said second means includes a switching circuit capable of selectively outputting one of a first track shift signal for increasing the speed of transportation of said recording medium by said transportation means and a second track shift signal for decreasing the speed of transportation of said recording medium by said transportation means by using the shifting direction discriminated by said discriminating means.

* * * * *